United States Patent Office 3,040,016
Patented June 19, 1962

3,040,016
POLYMERIZATION PROCESS
Jaroslav G. Balas, Orinda, and Lee M. Porter, Pleasant Hill, Calif., assignors to Shell Oil Company, New York, N.Y., a corporation of Delaware
No Drawing. Filed Mar. 28, 1960, Ser. No. 17,793
5 Claims. (Cl. 260—94.3)

This invention relates to the polymerization of diolefins. More particularly it relates to an improved process for polymerizing conjugated diolefins.

It is known that conjugated dienes may be polymerized to produce polymers which contain a very high proportion of cis 1,4-addition product. Polymers having this composition can be cured to very useful rubbers which may be employed with advantage in many commercial applications including the manufacture of tires. These novel synthetic rubbers are akin to natural rubber and even superior thereto in some respects such as resilience, low temperature flexibility, set and abrasion resistance.

In recent work leading to the production of polydiolefins such as polybutadiene having a high cis 1,4-content it was found that such polymers can be produced by polymerizing, for example, butadiene-1,3 in a non-aqueous solution containing as essential catalytic ingredient a compound of cobalt or nickel. Certain systems of catalysts consisting of cobalt or nickel compounds complexed with acidic metal halides, e.g., aluminum halide and combined with a metal organic compound of the type of aluminum alkyl or aluminum alkyl halide, were developed for carrying out the conversion of diolefins to rubbery polymers of high cis 1,4-content.

It is an object of this invention to provide an improved method for the polymerization of conjugated diolefins by means of catalysts which contain compounds of cobalt or nickel as their essential ingredients. It is another object of this invention to provide an improved method for preparing an active hydrocarbon soluble cobalt or nickel-containing polymerization catalyst for the polymerization of a diolefin to a polymer of high cis 1,4-content. Other objects will become apparent from the following description of the invention.

These and other objects are accomplished by the process comprising polymerizing a conjugated diolefin at temperatures ranging from about −40° to about 150° C. in the presence of hydrocarbon solvent and of a catalyst system consisting of one or more aluminum alkyl compounds and a hydrocarbon solution prepared from one or more inorganic salts of cobalt and/or nickel combined with a hydrocarbyl ester of phosphorous or phosphoric acid. For convenience, cobalt and nickel may be designated heavy metals, whereas aluminum is not a heavy metal.

The process of the invention may be applied to the polymerization of any conjugated diolefin hydrocarbon. It is particularly useful for the polymerization of butadiene-1,3 as this conjugated diolefin is found to polymerize according to the present invention with ease to produce a polymer having a very high portion of the cis 1,4 configuration. When the starting material is isoprene, the 1,4 polymerization is still usually predominant in this process although in this case considerable 3,4 polymerization may also occur. Other conjugated diolefins may be employed including, for example, 2,3-dimethyl butadiene-1,3; 2-ethyl butadiene-1,3; 4-methyl hexadiene-1,3; piperylene and the like. Not only may any conjugated diolefin be polymerized, but two or more conjugated dienes may be copolymerized to produce desired products. A representative copolymer of this type is, for example, a copolymer of butadiene and isoprene prepared according to the invention. Copolymerization with other ethylenically unsaturated compounds such as styrene may also be carried out according to this process.

An essential component of the catalysts used in the polymerization according to this invention are divalent inorganic salts of cobalt or nickel; the halides are particularly preferred. In the order of preference, these include cobalt chloride, nickel chloride, cobalt bromide, and nickel bromide. The iodides and fluorides of cobalt and nickel are less preferred. Other useful salts are the nitrates, sulfates, phosphates, carbonates, sulfides, cyanides and the like. The salts are utilized in the purified form, free of water of crystallization.

Together with the cobalt or nickel salt there are used as co-catalysts aluminum alkyl compounds. These are preferably aluminum alkyl halides, more specifically aluminum monoalkyl dihalides, aluminum dialkyl monohalides and mixtures thereof, including aluminum sesquihalides. Mixtures of aluminum alkyl halides with aluminum trialkyls may also be employed.

Representative alkyl aluminum compounds include those represented by the formulas $AlR_3$, $AlR_2X$, $AlRX_2$ and $Al_2R_3X_3$. In these formulas R may be the same or different alkyl radicals of 1 to 10 carbon atoms such as methyl, ethyl, propyl, isopropyl, n-butyl, isobutyl, octyl, nonyl and the like. In the preferred embodiment the R's are lower alkyls having from one to four carbon atoms, with ethyl being particularly preferred. The preferred halogen (X) occurring in the aluminum alkyl halides is chlorine. Bromine is less preferred.

The polymerization of diolefins according to this invention is carried out in solution with a suitable non-aqueous diluent or solvent. The nature of the reaction medium may have a substantial effect on the polymerization reaction, particularly on the rate thereof and the nature of the product. The solvent preferably consists substantially of aliphatic, cycloaliphatic, and/or aromatic hydrocarbons. Aliphatic olefins may be used in some cases; e.g., in the polymerization of butadiene the solvent may consist mainly of normal butenes. Preferred solvents for the production of polybutadiene are aromatic hydrocarbons, particularly benzene and/or toluene. Cycloparaffins are also suitable in such polymerization; cyclohexane is preferred.

In the polymerization of butadiene in the presence of an aromatic hydrocarbon, the benzene or other aromatic hydrocarbon present is suitably the sole solvent, or, if aromatic is used with an aliphatic diluent, the amount of aromatic should be sufficient to permit the resulting polybutadiene to remain in solution in the liquid reaction mixture. This is readily determined in each instance and varies with the amount of butadiene charged, the temperature and the individual aliphatic solvent. For example, with butene as the solvent, 8 to 10% benzene is generally sufficient. Saturated $C_4$ diluents may require admixture of 25 to 35% benzene. Cycloparaffins can be used to serve the same purpose as aromatics but are preferably used in higher minimum concentration.

In the preferred method of catalyst preparation according to this invention the catalyst is produced in a hydrocarbon medium consisting of the same solvents which are used in the polymerization reaction itself. The catalyst solution is suitably prepared by adding to the hydrocarbon solvent a desired amount of aluminum alkyl or aluminum alkyl halide or mixture thereof and then adding thereto a solution prepared from an inorganic salt of cobalt or nickel and a hydrocarbyl ester of phosphorous or phosphoric acid.

The hydrocarbyl esters of phosphorous acid ($H_3PO_3$) and phosphoric acid ($H_3PO_4$) are compounds having the respective formulas $(RO)_3P$ and $(RO)_3PO$ wherein R represents a hydrocarbyl group free of terminal olefinic double bonds, preferably of from one to twelve carbon atoms per group, and most preferably an alkyl group of from one to eight carbon atoms. Suitable compounds of this type are trimethylphosphite or phosphate, triethylphosphite or phosphate, tri-n-propylphosphite or phosphate, tri-isopropylphosphite or phosphate, tri-n-butylphosphite or phosphate, tri-isobutylphosphite or phosphate, tri-n-octylphosphite or phosphate, triphenylphosphite or phosphate, tri-cyclohexylphosphite or phosphate, and the like. Although more complex compounds, e.g., those having mixed hydrocarbyl groups (butyl-di-isoamylphosphite or phosphate; di-isopropyl-n-butylphosphite or phosphate; butyl-dipenylphosphite or phosphate) or those having involved hydrocarbyl structures, can be employed to give the desired effect, it is preferred for practical reasons to use commercially available compounds such as tributylphosphite or phosphate, triethyl-, triphenyl-, or tris(2-ethylhexyl)phosphite or phosphates, and the like.

The concentration of diolefin in the reaction mixture is suitably up to about 25% by weight or more. Variations within this range may affect the molecular weight of the polymer. At relatively low concentrations of diolefin the viscosity of the polymer solution and the molecular weight of the polymer will be relatively lower.

The total concentration of cobalt and/or nickel compounds in the reaction mixture is generally lower than that corresponding to one milliatom of cobalt and/or nickel per liter and preferably lower than that corresponding to 0.1 milliatom of cobalt and/or nickel per liter. These values correspond to about 70 and 7 p.p.m., respectively, of cobalt or nickel. If introduced into the system according to the invention, the halides of cobalt and/or nickel have a very favorable effect even at a very low concentration. It may be necessary to choose limited concentrations in order to prevent excessive polymerization rates which will lead to excessive generation of heat. The use of these compounds in small amounts is, of course, also attractive from the economy standpoint. Not only does the reduced consumption of chemicals lower the cost price, but simplification of the procedure may also result in economies. Whereas in related processes the removal of catalyst remnants from the polymers is usually a very cumbersome procedure, this may often be entirely omitted in the present case; the concentrations of cobalt and nickel in the products obtained according to the invention are frequently so low that they have very little detrimental effect.

The total concentration of aluminum alkyl compounds in the reaction mixture generally corresponds to 1 to 20 milliatoms of aluminum per liter (30 to 600 p.p.m. of aluminum).

The ratio of the number of atoms of aluminum to the number of atoms of cobalt and/or nickel in the active catalyst is preferably greater than 10:1. A value of this ratio between 100:1 and 100,000:1 is especially preferred.

The molar ratio of phosphorus compound to cobalt or nickel compound in the catalytic hydrocarbon solution is generally about 2:1. It is preferred to add about 2 moles of phosphorus ester per mole of cobalt or nickel salt in the preparation of the catalytic solution, but greater or smaller amounts may be employed. When a smaller amount is employed a solution having a lower heavy metal content will be obtained. When a greater amount is employed, some of it will not be associated with the heavy metal salt.

The temperature at which the reaction is carried out will depend upon the catalyst and the solvent utilized and to some extent upon the result desired. Temperatures generally range from about −20° C. to about 100° C. Temperatures between 10° and 70° C. are particularly preferred, although higher and lower temperatures may also be used.

The process is conducted in an inert atmosphere. This is preferably accomplished by first sweeping out the reaction zone with an inert gas. Suitable inert materials include nitrogen, methane and the like.

The most convenient operating pressure is that which is generated by the system. This will vary depending upon the specific nature of the conjugated diene, the solvent and the respective amounts. Such pressures are termed "autogenic" pressures. If desired, higher or lower pressures may be employed, e.g., in the range from 1 to 30 or more atmospheres absolute.

Both the preparation of the catalyst and the polymerization of conjugated dienes according to the invention may be performed batchwise or continuously. If desired, the later operation is carried out in reaction mixtures of constant composition which are kept homogeneous.

The invention is further illustrated by the following examples. It is to be understood that examples are for the purpose of illustration and the invention is not to be regarded as limited by any of the specific conditions recited therein.

*Example 1*

To illustrate the relative proportions, a reaction is carried out in a hydrocarbon solvent with an initial aluminum ethyl dichloride concentration of 10 milliatoms aluminum per liter and an aluminum to cobalt atomic ratio of 1000:1. To a reaction containing 100 liters of hydrocarbon solvent, e.g., benzene or cyclohexane, at 30° C. is added 127 grams (1 mole) aluminum ethyl dichloride. The catalyst is to be $CoCl_2$ combined with tri-n-butyl phosphate. The catalyst is suitably prepared by placing 2 grams or more anhydrous $CoCl_2$ into a vessel with 100 grams benzene at room temperature, adding 2 grams or more pure tributyl phosphate and agitating the mixture. A blue solution is produced which can be decanted or recovered by filtration. The solution may contain 5000 p.p.m. cobalt. Enough solution is to be added to provide 1 milliatom of cobalt (0.130 gram $CoCl_2$). The solution contains, besides the $CoCl_2$, about 2 moles of tributylphosphate per mole of $CoCl_2$. The catalytic solution is completed by adding the required amount of the cobalt solution to the reaction vessel. Polymerization is then carried out by gradual addition of butadiene, e.g., about 10 liter (liquid) over a period of one to two hours, while the temperature is maintained at 30° C. Polybutadiene is then recovered in the conventional manner. If it is considered undesirable to attempt to add the small amount of $CoCl_2$ solution directly to the 100 liter reaction vessel, the $CoCl_2$-tributylphosphate may be dissolved in, say, 10 cc. to 1 liter of hydrocarbon solvent and this solution added to the reaction vessel.

*Example 2*

A 5% by weight solution of aluminum diethyl chloride in benzene is added to 50 ml. of benzene in sufficient amount to provide 300 p.p.m. of the aluminum compound. A solution of $CoCl_2$ is separately prepared by placing approximately equal weights of $CoCl_2$ and tributylphosphate into contact with benzene at room temperature, agitating and ultimately decanting a blue solution containing 0.002 mole per liter of a complex of the approximate composition $CoCl_2 \cdot 2(C_4H_8)_3PO_4$. Enough of the cobalt solution is added to the benzene and aluminum alkyl to provide a cobalt concentration of 2 p.p.m. About 15 minutes later, gaseous butadiene is introduced while the mixture is held and agitated at room temperature until the solution is saturated. Polybutadiene is recovered in the conventional manner. The polymer has a cis-1,4 content of 98.1%, as well as 0.9% trans-1,4 and 1.0% 1,2 structure. The intrinsic viscosity, measured in toluene at 25° C., is 7.14.

Similarly good results are obtained when $NiCl_2$, $CoBr_2$, $Ni(NO_3)_2$ and other nickel and cobalt salts are substituted for the $CoCl_2$; when tributyl phosphite, tripropyl phosphate, tripropyl phosphite, tri-octyl phosphate and the like are substituted for the tributyl phosphate; and when cyclohexane or a mixture of 25 parts benzene and 75 parts butene-1 is substituted for the benzene solvent.

We claim as our invention:

1. A process for producing polybutadiene containing a high proportion of cis 1,4-structure which comprises polymerizing butadiene at a temperature in the range from —40° to 150° C. in a hydrocarbon solution containing as catalytic components aluminum alkyl halide having 1 to 10 carbon atoms in each alkyl group, in a concentration corresponding to 1 to 20 milliatoms of aluminum per liter, and a cobaltous halide added to said solution in the form of a solution comprising said cobaltous halide and at least about 2 moles, per mole of cobaltous halide, of a compound from the group consisting of $(RO)_3P$ and $(RO)_3PO$, wherein R is an alkyl group of 1 to 8 carbon atoms having no olefinic double bonds, the concentration of cobalt in said hydrocarbon solution being such as to provide therein a ratio of atoms of aluminum to atoms of cobalt greater than 10:1.

2. A polymerization process which comprises contacting a conjugated diolefin hydrocarbon having from 4 to 7 carbon atoms per molecule in substantially anhydrous solution at a temperature in the range from —40° to 150° C. with a catalyst prepared by admixing a divalent inorganic salt selected from the group consisting of the halides, nitrates, sulfates, phosphates, carbonates, sulfides and cyanides of cobalt and nickel and at least about 2 moles, per mole of heavy metal salt, of a compound from the group consisting of $(RO)_3P$ and $(RO)_3PO$, wherein R is a hydrocarbyl group of 1 to 12 carbon atoms, having no olefinic double bonds, with a hydrocarbon solvent and at least one member selected from the group consisting of aluminum trialkyl, aluminum alkyl halides and mixtures thereof having 1 to 10 carbon atoms per alkyl group, the concentration of heavy metal in solution being such as to provide therein a ratio of atoms of aluminum to atoms of heavy metal greater than 10:1.

3. A process according to claim 2 wherein the aluminum alkyl compounds are aluminum alkyl halides.

4. A process for producing polybutadiene containing a high proportion of cis-1,4 structure which comprises polymerizing butadiene at a temperature in the range from —40° to 150° C. in a hydrocarbon solution containing as catalytic components an aluminum ethyl chloride in a concentration corresponding to 1 to 20 milliatoms of aluminum per liter and cobaltous chloride and at least about 2 moles, per mole of cobaltous chloride, of a compound from the group consisting of $(RO)_3P$ and $(RO)_3PO$ wherein R is a butyl group, the concentration of cobalt in said hydrocarbon solution being such as to provide therein a ratio of atoms of aluminum to atoms of cobalt greater than 10:1.

5. A polymerization process which comprises contacting a conjugated diolefin hydrocarbon having from 4 to 7 carbon atoms per molecule in substantially anhydrous solution at a temperature in the range from —40° to 150° C. with a catalyst prepared by admixing cobaltous halide and at least about 2 moles, per mole of cobaltous halide, of a compound from the group consisting of $(RO)_3P$ and $(RO)_3PO$, wherein R is a hydrocarbyl group of 1 to 12 carbon atoms, having no olefinic double bonds, with a hydrocarbon solvent and at least one member selected from the group consisting of aluminum trialkyl, aluminum alkyl halides and mixtures thereof, having 1 to 10 carbon atoms per alkyl group, the concentration of cobalt in solution being such as to provide therein a ratio of atoms of aluminum to atoms of cobalt greater than 10:1.

References Cited in the file of this patent

UNITED STATES PATENTS

| | | |
|---|---|---|
| 2,953,556 | Wolfe | Sept. 20, 1960 |
| 2,956,991 | Coover | Oct. 18, 1960 |

FOREIGN PATENTS

| | | |
|---|---|---|
| 789,781 | Great Britain | Jan. 29, 1958 |